US007376916B1

(12) United States Patent
Ebergen et al.

(10) Patent No.: US 7,376,916 B1
(45) Date of Patent: May 20, 2008

(54) PERFORMING A CONSTRAINED OPTIMIZATION TO DETERMINE CIRCUIT PARAMETERS

(75) Inventors: Jo C. Ebergen, San Francisco, CA (US); George J. Chen, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 407 days.

(21) Appl. No.: 11/111,655

(22) Filed: Apr. 20, 2005

(51) Int. Cl.
*G06F 17/50* (2006.01)
*G06F 9/455* (2006.01)
(52) U.S. Cl. .............. 716/2; 716/1; 716/4; 716/11; 703/2
(58) Field of Classification Search .......... 716/4–6, 716/11; 705/37; 703/2; 342/96
See application file for complete search history.

(56) References Cited

U.S. PATENT DOCUMENTS

| | | | | |
|---|---|---|---|---|
| 5,999,714 | A * | 12/1999 | Conn et al. ................ | 716/2 |
| 6,321,362 | B1 * | 11/2001 | Conn et al. ................ | 716/2 |
| 6,327,581 | B1 * | 12/2001 | Platt ........................... | 706/12 |
| 6,404,380 | B2 * | 6/2002 | Poore .......................... | 342/96 |
| 6,721,924 | B2 * | 4/2004 | Patra et al. .................. | 716/2 |
| 2004/0148579 | A1 * | 7/2004 | Visweswariah ............. | 716/2 |
| 2005/0137959 | A1 * | 6/2005 | Yan et al. .................... | 705/37 |
| 2006/0075365 | A1 * | 4/2006 | Hershenson et al. ........ | 716/2 |

OTHER PUBLICATIONS

Conn et al., "JiffyTune: circuit optimization using time-domain sensitivities"; Computer-Aided Design of Integrated Circuits and Systems, IEEE Transactions on; vol. 17, Issue 12, Dec. 1998 pp. 1292-1309.*
I-Min Liu et al., "An efficient buffer insertion algorithm for large networks based on Lagrangian relaxation", Oct. 10-13, 1999 Computer Design, 1999. (ICCD '99) International Conference on, pp. 210-215.*

* cited by examiner

*Primary Examiner*—Stacy A Whitmore
*Assistant Examiner*—Helen Rossoshek
(74) *Attorney, Agent, or Firm*—Park, Vaughan & Fleming LLP; Anthony P. Jones

(57) ABSTRACT

One embodiment of the present invention provides a system which performs a constrained optimization of circuit parameters. During operation, the system selects two circuit parameters associated with a circuit path, wherein the optimization is to be performed on the first circuit parameter while a limitation on second circuit parameter functions as a constraint on the optimization of the first circuit parameter. Next, the system generates objective functions which model the first circuit parameter and the second circuit parameter in terms of logical effort. The system then uses the objective functions to generate a constraint expression, wherein the constraint expression mathematically relates the optimization of the first circuit parameter to the constraint on the second circuit parameter. Next, the system computes a trade-off curve using the constraint expression. The system then computes transistor sizes for the circuit path based on a selected point from the trade-off curve.

15 Claims, 6 Drawing Sheets

PERFORMING A CONSTRAINED OPTIMIZATION TO DETERMINE CIRCUIT PARAMETERS

BACKGROUND

1. Field of the Invention

The present invention relates to techniques for improving circuit performance. More specifically, the present invention relates to a method for performing a constrained optimization to determine circuit parameters.

2. Related Art

The circuit in FIG. 1 illustrates the series of challenges facing the modern integrated circuit designer. Note that the circuit includes a path of N+1 gates with side loads. For the purposes of illustration, assume that a gate i has a drive strength $x_i$. In addition, assume that both the drive strength ($x_0$) of gate 0 and the side loads are fixed.

The first challenge is finding the drive strengths $x_i$, $0 < i \leq N$, that minimize the transistor area A of this path under the constraint that the total path delay is at most $D_0$. A more general question is to find the minimal transistor area $A(D_0)$ as a function of the delay constraint $D_0$. This "cost function" reveals to the designer how the cost in terms of transistor area behaves as a function of the delay constraint $D_0$. Knowing this cost function permits a designer to choose the best trade-off between area and path delay.

The inverse of the first challenge is to find the drive strengths $x_i$, $0 < i \leq N$, that minimize the path delay D of this path under the constraint that the total transistor area of the path is at most $A_0$. Here, the more general question is to find the minimal path delay $D(A_0)$ as a function of the area constraint $A_0$. This cost function reveals to the designer how the cost in terms of minimum path delay behaves as a function of the area constraint $A_0$.

A different, but similar, challenge is to find the drive strengths $x_i$, $0 < i \leq N$, that minimize the energy dissipation E of the path under the constraint that the total path delay is at most $D_0$. For this problem, we want to find how the cost $E(D_0)$ in terms of energy behaves as a function of the delay constraint $D_0$. Conversely, we also want to find how the minimum path delay $D(E_0)$ behaves as a function of the energy constraint $E_0$.

Another challenge arises with a cyclic path. In the case of a cyclic path, the path delay becomes the cycle time and the function $A(D_0)$ represents the transistor area for a constraint $D_0$ on the cycle time. Conversely, $D(A_0)$ represents the minimum cycle time for the constraint $A_0$ on the transistor area.

Researchers have proposed multiple solutions to the above-described constrained circuit optimization problems. Unfortunately, the proposed solutions fall short in one aspect or another, thereby limiting their effectiveness for many applications of interest. For example, several of the proposed solutions employ over-inclusive or non-convergent modeling techniques, which lead to prohibitive run-times or outright failure in some applications.

Hence, what is needed is a method for performing a constrained optimization to determine circuit parameters in a manner which expediently and accurately converges on a useful solution.

SUMMARY

One embodiment of the present invention provides a system which performs a constrained optimization of circuit parameters. During operation, the system selects two circuit parameters associated with a circuit path, wherein the optimization is to be performed on the first circuit parameter while a limitation on second circuit parameter functions as a constraint on the optimization of the first circuit parameter. Next, the system generates objective functions which model the first circuit parameter and the second circuit parameter in terms of logical effort. The system then uses the objective functions to generate a constraint expression, wherein the constraint expression mathematically relates the optimization of the first circuit parameter to the constraint on the second circuit parameter. Next, the system computes a trade-off curve using the constraint expression. The system then computes transistor sizes for the circuit path based on a selected point from the trade-off curve.

In a variation of this embodiment, generating objective functions involves creating a first expression $A(x)$ for the first parameter of the circuit path and creating a second expression $B(x)$ for the second parameter of the circuit path.

In a variation of this embodiment, the parameters of the circuit path can include area, path delay, energy consumption, or any circuit path parameter which is expressed using the theory of logical effort.

In a variation of this embodiment, the path delay through the circuit path includes wire delay.

In a variation of this embodiment, generating the constraint expression involves placing the objective functions into a constraint expression, performing a Lagrangian relaxation on the constraint expression, and modifying the constraint expression using the gradients of the objective functions. Following these operations, the constraint expression is $\nabla A(x) = -\lambda \nabla B(x)$, for all $\lambda > 0$, and where $\lambda$ is a Lagrangian multiplier.

In a variation of this embodiment, computing the trade-off curve involves solving the constraint expression for each Lagrangian multiplier in a set of Lagrangian multipliers and plotting the value of each solution of the constraint expression as a point on the trade-off curve.

In a further variation, solving the constraint expression involves using the iterative process of coordinate-wise descent.

In a variation of this embodiment, selecting a point on the trade-off curve involves selecting the point on the curve that corresponds to the desired relationship between the first circuit parameter and the second circuit parameter.

Figure 1:
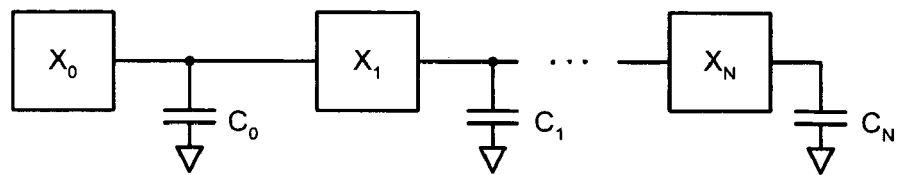
FIG. 1 illustrates a circuit path consisting of N+1 gates.

Table 1 presents successive values for $(x_1, x_2)$ of the coordinate-wise descent algorithm when $\lambda=\infty$ in accordance with an embodiment of the present invention.

Table 2 presents successive values for $(x_1, x_2)$ of the coordinate-wise descent algorithm when $\lambda=\infty$ in accordance with an embodiment of the present invention.

Table 3 presents successive values for $(x_1, x_2)$ of the coordinate-wise descent algorithm in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Logical Effort

We solve the constrained optimization problems using ideas from the theory of logical effort. (see Ivan Sutherland, Bob Sproull, and David Harris. *Logical Effort: Designing Fast CMOS Circuits*. Morgan Kaufmann Publishers, Inc., 1999.) We express path delay, total transistor area for a path, and energy dissipation of a path by means of logical efforts of gates. Note that the drive strength of a gate i is denoted as $x_i$, the logical effort of a gate's input is denoted as $g_i$, and the gate's parasitic delay is denoted as $p_i$.

We first look at path delay. We can relate the gate delay $s_i$ of gate i and the gate's drive strength $x_i$ as follows for $0 \leq i \leq N$:

$$s_i * x_i = p_i * x_i + g_{i+1} * x_{i+1} + C_i, \quad (1)$$

where $g_{N+1}=0$ and $x_{N+1}=0$. (see [Ebergen 2004] J. Ebergen, J. Gainsley, and P. Cunningham. Transistor sizing: How to control the speed and energy consumption of a circuit. In *Proc. International Symposium on Advanced Research in Asynchronous Circuits and Systems*, pages 51-61. IEEE Computer Society Press, April 2004.) From this equation we can derive gate delay $s_i$ for gate i as $$s_i = p_i + (g_{i+1} * x_{i+1} + C_i)/x_i.$$

The path delay $D(x)$ is simply the sum of all gate delays, which yields $$D(x) = \sum_{i=0}^{N} p_i + \sum_{i=0}^{N} C_i/x_i + \sum_{i=0}^{N} g_{i+1} * x_{i+1}/x_i \quad (2)$$

where $x_{N+1}=0$ and $g_{N+1}=0$.

In accordance with Ebergen 2004, the capacitance, delay, drive strength, and energy consumption for a path can be expressed in units that depend on the process technology. The unit for capacitance is $\Lambda$, which is the input capacitance of a minimum-sized inverter. The unit for delay is $\tau$, which is the delay of an ideal inverter without diffusion capacitance driving an identical inverter. The unit for drive strength is $\Lambda/\tau$, or capacitance per time unit. The unit for energy is $\epsilon$, which is the energy dissipated by a minimum-sized inverter without diffusion capacitance driving an identical inverter.

Finding an expression for the total transistor area of a path is simpler than finding an expression for path delay. As a measure for the total transistor area of a path, we add all transistor widths of the gates and require that all transistors are of minimum length. Like the units for delay and energy, which are $\tau$ and $\epsilon$ respectively, we define the unit for area as the total transistor area of a minimum-sized inverter. We denote the unit of area with a. Note that with this definition, the area unit depends on the particular process technology. The properties we derive, however, do not depend on a particular process technology.

Because the total input capacitance of a gate is proportional to the total transistor width of a gate, we can represent the total transistor width of a single gate as $\Sigma_j(g_{j,i} * x_i) = (\Sigma_j g_{j,i}) * x_i$, where j ranges over all inputs of gate i. Let us denote the sum of all logical efforts of inputs of gate i, also called the total logical effort of gate i, by $tg_i$, that is, $\Sigma_j g_{j,i} = tg_i$. With this definition, a measure for the total transistor area of all gates on the path as a function of the vector of drive strengths x is $$A(x) = \sum_{i=0}^{N} tg_i * x_i.$$

Finding an expression for the total energy dissipation of a path is also straightforward. A gate i spends an energy proportional to $s_i * x_i$ driving the gate's output capacitance. The constant of proportionality is c, which is the energy dissipated by a minimum-sized inverter without any parasitics driving a copy of itself. The total energy dissipated by the path as a function of the vector x of drive strengths, where each gate drives the gate's associated output once, is $$E(x) = \sum_{i=0}^{N} s_i * x_i$$

$$= \sum_{i=0}^{N} (p_i * x_i + g_{i+1} * x_{i+1} + C_i) \quad \text{(from eqn (1))}$$

$$= \sum_{i=0}^{N} ((p_i + g_i) * x_i + C_i)$$

assuming that $g_0=0$.

Given these expressions for path delay, area, and energy consumption, we can formulate our problems formally. The problem statement for area minimization under a delay constraint becomes:
 find the vector of drive strengths x that minimizes A(x) subject to the constraint that $D(x) \leq D_0$.

The problem statement for delay minimization under an area constraint becomes:
 find the vector of drive strengths x that minimizes D(x) subject to the constraint that $A(x) \leq A_0$.

Similarly, the problem statement for energy consumption minimization under a delay constraint becomes:
 find the vector of drive strengths x that minimizes E(x) subject to the constraint that $D(x) \leq D_0$.

The problem statement for delay minimization under a energy consumption constraint becomes:
 find the vector of drive strengths x that minimizes D(x) subject to the constraint that $E(x) \leq E_0$.

Convex Optimization

Because each of the functions D(x), A(x), and E(x) are convex functions, each of the constrained minimization problems is a well known convex optimization problem. (see [Boyd 2004] Stephen Boyd and Lieven Vandenberghe. *Convex Optimization*. Cambridge University Press, 2004.) There are many general techniques to solve these optimization problems. We use the technique called Lagrangian relaxation. The problem for area minimization:
 find x that minimizes A(x) subject to $D(x) \leq D_0$, is equivalent to the Lagrangian relaxation problem:
 find x, $\lambda > 0$ that minimizes $A(x) + \lambda(D(x) - D_0)$.

Note that in the preceding expressions, the parameter $\lambda$ is the Lagrange multiplier. There are various techniques used to solve Lagrangian relaxation.

To construct the area-delay trade-off curve, we have to find the values $A(D_0)$ for a series of values $D_0$. For each value of $D_0$ we can apply Lagrangian relaxation and find the values of $x_0$, $\lambda_0 > 0$ that minimize $A(x) + \lambda(D(x) - D_0)$. The value of $A(x_0)$ is then the value $A(D_0)$ we are looking for. Instead of minimizing $A(x) + \lambda(D(x) + D_0)$ over all x and $\lambda$ for each choice of $D_0$, we apply a slightly different method. For each $\lambda$, we compute the value $x_\lambda$ that satisfies $$\nabla A(x) = -\lambda \nabla D(x), \quad (3)$$

where $\nabla$ denotes the gradient in x, the vector of first-order derivatives to x. The value $x_\lambda$ minimizes the function $A(x) + \lambda D(x)$, where $\lambda$ is fixed. Because the function $A(x) + \lambda D(x)$ is convex, any local minimum is the global minimum, and as a consequence the value of $x_\lambda$ is unique. Furthermore, $x_\lambda$ is the value that minimizes A(x) subject to $D(x) \leq D(x_\lambda)$. Finally, the value $x_\lambda$ is also the value that minimizes D(x) subject to $A(x) \leq A(x_\lambda)$. Consequently, the points $(A(x_\lambda), D(x_\lambda))$ are the points on the area-delay trade-off curve for all choices of $\lambda > 0$.

To solve our constrained optimization problems we must find the gradients in x for the path delay, area, and energy consumption functions D, A, and E respectively. The only variables for an acyclic path are $x_1$ through $x_N$. Recall that for an acyclic path, drive strength $x_0$ is fixed. For the total area A we have, for $0 < i \leq N$, $$(\nabla A)_i = \frac{\partial A}{\partial x_i} = tg_i.$$

For the total energy E we have, for $0 < i \leq N$.

$$(\nabla E)_i = \frac{\partial E}{\partial x_i} = p_i + g_i.$$

These gradients are constant vectors, where the elements are sums of logical efforts. For the gradient of D, we find $$(\nabla D)_i = \frac{\partial D}{\partial x_i} = (g_i / x_{i-1} - (C_i + g_{i+1} * x_{i+1}) / x_i^2).$$

where $g_{N+1} = 0$ and $x_{N+1} = 0$.

A Graphical Illustration

Figure 2:
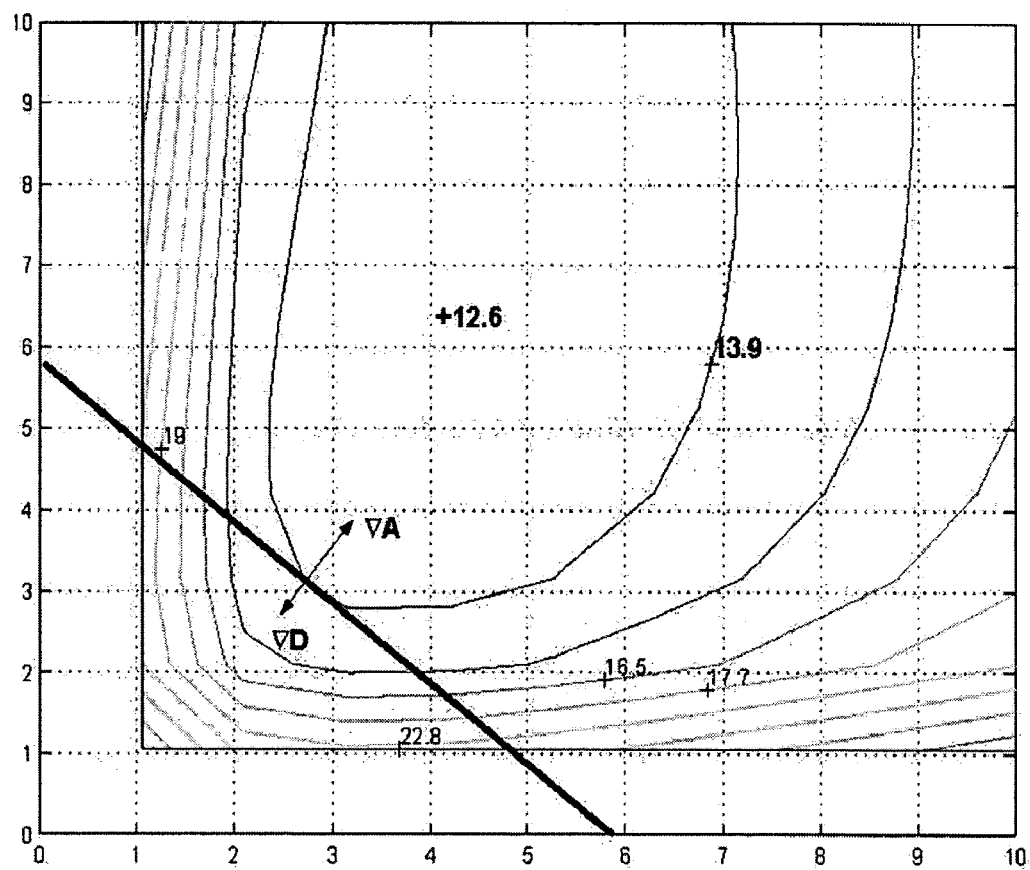
FIG. 2 presents a plot where the expression $\nabla A(x) = -\lambda \nabla D(x)$ is used to calculate the point that minimizes the area $A(x)$ under the constraint that $D(x) \leq D_0$ in accordance with an embodiment of the present invention.

FIG. 2 presents a plot where the expression $\nabla A(x) = -\lambda \nabla D(x)$ is used to calculate the point that minimizes the area A(x) under the constraint that $D(x) \leq D_0$ in accordance with an embodiment of the present invention.

Figure 4:
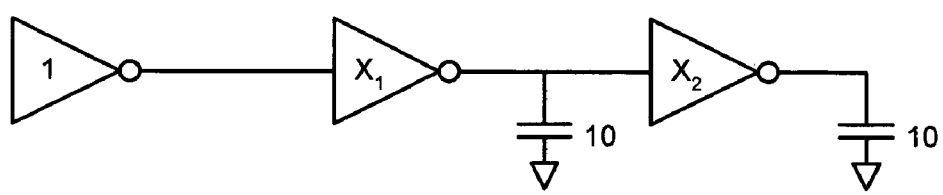
FIG. 4 illustrates a string of three inverters with one side load and one final load in accordance with an embodiment of the present invention.

Within FIG. 2 is a contour plot of a delay function D(x) of two variables $x_1$ and $x_2$ for a simple circuit (see the circuit in FIG. 4). The delay contours are shown as a series of nested deformed circles. Each delay contour indicates all points with the same path delay. Note that the increments of the contour values are 10% of the minimum value. The path delay around the minimum 12.6 is very flat. The gradient $\nabla D$ in a point on a delay contour is a vector that points in the direction of steepest increase, and the length of the vector indicates the size of the increase. The gradient in a point is always perpendicular to the tangent of the delay contour.

The area function is a linear function of x and its contours are straight lines. We have shown one area contour in FIG. 2 using a bold black line. Area contours with a higher value are further from the origin and area contours with a smaller value are closer to the origin. The gradient of the area function is a constant vector for all points $(x_1, x_2)$.

Let us say that the delay constraint is $D(x) \leq 13.9$. We want to find the minimum area A(x) satisfying this delay constraint. We can find this point graphically by finding the contour for the area function that is closest to the origin and intersects the contour $D(x) = 13.9$. In other words, we have to find the area contour that is closest to the origin and that touches the contour $D(x) = 13.9$. In the point where both contours touch, their gradients are co-linear, but point in opposite direction, as illustrated in FIG. 2. This point is uniquely defined by the equation $$\nabla A(x) = -\lambda \nabla D(x) \text{ for some } \lambda > 0 \text{ and } D(x) = 13.9.$$

Alternatively, fixing $\lambda$ instead of $D_0$, there is a unique value $x_\lambda$ that satisfies $\nabla A(x) = -\lambda \nabla D(x)$. The point $(A(x_\lambda), D(x_\lambda))$ defines a point on the area—delay trade-off curve.

A similar reasoning applies for minimizing the total energy dissipation $E(x)$ of a path under a delay constraint for the path. Then we find for each $\lambda$, the value $x_\lambda$ that satisfies $$\nabla E(x) = -\lambda \nabla D(x). \quad (4)$$

Plotting the Trade-Offs

Figure 3:
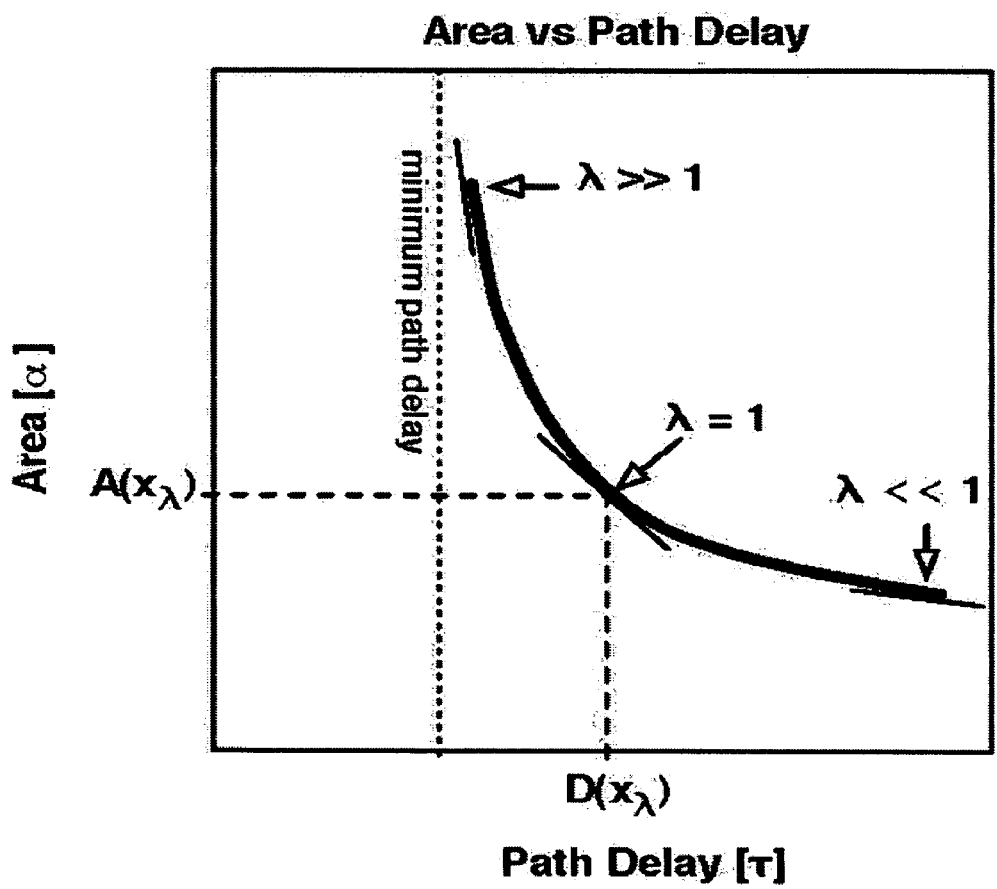
FIG. 3 presents a plot of area $A(x_\lambda)$ versus delay $D(x_\lambda)$ for a finite range of values for $\lambda$ in accordance with an embodiment of the present invention.

We can plot the area $A(x_\lambda)$ versus delay $D(x_\lambda)$ for all values of $\lambda$. FIG. 3 presents a plot of area $A(x)$ versus delay $D(x)$ for a finite range of values for $\lambda$ in accordance with an embodiment of the present invention. This plot illustrates the trade-off between path delay and total area. The designer can find for each constraint ($\lambda$) for the path delay what the minimum area is, or for each area constraint what the minimum path delay is. For the chosen combination of path delay $D(x_\lambda)$ and area $A(x_\lambda)$, the vector $x_\lambda$ gives the drive strengths of the gates on the path.

The tangent of the area versus delay function in the point $(D(x_\lambda), A(x_\lambda))$ is $-\lambda$. In each point on the area versus delay curve, the value of $\lambda$ indicates the trade-off between area and delay. A small change $\delta$ in $D(x_\lambda)$ creates a change $-\lambda * \delta$ in $A(x_\lambda)$. Conversely, a small change $\delta$ in $A(x_\lambda)$ creates a change $-\delta/\lambda$ in $D(x_\lambda)$. For example, in the point that corresponds to $\lambda=1$, we can trade one unit $\tau$ of extra delay for one unit a of less area.

Note that for $\lambda$ approaching infinity, $x_\lambda$ approaches the value that minimizes the path delay $D(x)$ without any constraint. Alternatively, for acyclic paths, the value for $x_\lambda$ that achieves the minimum path delay is finite, and thus the area for minimum path delay is finite. For cyclic paths, the minimum cycle time is unattainable for finite values of $x_\lambda$. For cyclic paths, the area goes to infinity as the cycle time approaches the minimum cycle time. The minimum cycle time is an asymptote for the area versus delay function.

Because the delay function around the minimum path delay is typically very flat, the area versus delay curve typically has a long steep part close to the minimum path delay, as illustrated in FIG. 3. This part indicates that for a small change in path delay there can be a large change in area. In other words, a small decrease in path delay close to the minimum comes with a high cost in terms of increase in area.

Finding $x_\lambda$ by Coordinate-Wise Descent

For a given $\lambda$, we find the vector $x_\lambda$ that satisfies $\nabla A(x) = -\lambda \nabla D(x)$ by coordinate-wise descent. The method of coordinate-wise descent is simple and converges rapidly to the solution.

Initially the algorithm can start at any vector x. In absence of any good choice of start vector, you can use the vector $x_i = 1$ for all $0 < i \leq N$.

For each i from N to 1, the algorithm updates coordinate $x_i$ using equation (3), where we assume that all variables except $x_i$ are fixed. After each update of a variable in $x_N$ through $x_1$, the function $A(x) + \lambda D(x)$ decreases or remains the same. After several rounds of updates, the variables $x_N$ through $x_1$ rapidly approach the minimum of the function. When the relative change in each $x_i$ is less than a prescribed tolerance, the algorithm terminates.

The algorithm calculates each update to variable $x_i$, $0 < i \leq N$, as follows. When only $x_i$ is variable, equation (3) reduces to $$tg_i = -\lambda * (g_i/x_{i-1} - (C_i + g_{i+1} * x_{i+1})/x_i^2)$$

where $g_{N+1} = 0$ and $x_{N+1} = 0$. Solving for $x_i$ yields $$x_i = \sqrt{\frac{C_i + g_{i+1} * x_{i+1}}{(tg_i/\lambda) + g_i/x_{i-1}}}.$$

We call the right-hand side of this equation the "update function" for variable $x_i$.

$$update_i(x_{i+1}, x_{i-1}, \lambda) = \sqrt{\frac{C_i + g_{i+1} * x_{i+1}}{(tg_i/\lambda) + g_i/x_{i-1}}}.$$

The algorithm (where $x^{(k)}$ is the k-th approximation of $x_\lambda$) is as follows:

$x^{(0)} := 1;$ $k := 0;$ repeat $k := k+1$;

for $i = N$ to 1 do $x_i^{(k+1)} := update_i(x_{i+1}^{(k)}, x_{i-1}^{(k+1)}, \lambda)$ od until $\|x^{(k+1)} - x^{(k)}\| < tol * \|x^{(k+1)}\|$;

Note that if you want to start the algorithm with $x_i = 0$, for all $0 < i \leq N$, the above formulas must be rewritten to avoid division by 0.

When the path is a cycle, some updates are slightly different. First, the drive strength $x_0$ of gate 0 is no longer fixed, but variable. Consequently, the indices are from 0 through N. Second, because each of the gates 0 through N is part of a cycle, the addition in indices is modulo N+1.

When we want to find the minimum energy dissipation of a path under a delay constraint, we find for each $\lambda$ the value $x_\lambda$ that satisfies $\nabla E(x) = -\lambda \nabla D(x)$ where $(\nabla E)_i = p_i + g_i$ for $0 < i \leq N$. This condition is similar to that for area minimization. In other words, to find $x_\lambda$ for energy minimization, we only need to substitute $p_i + g_i$ for $tg_i$ in the algorithm for area minimization.

Constraints for Drive Strengths

So far we have not put any constraints on the drive strengths. Drive strengths often have two types of constraints. First, drive strengths can assume only values between a lower bound $L_i$ and upper bound $U_i$, which may be specific to each gate i—$L_i \leq x_i \leq U_i$. Second, drive strengths often assume only discrete values, rather than continuous values. How can we incorporate these two constraints?

Before we deal with the two constraints, we observe a property of the update function. The update function $update_i$ for variable $x_i$, is a monotonic function in $x_{i+1}$, $x_{i-1}$, and $\lambda$. This means that that for two points $p0 = (x0_{i+1}, x0_{i-1}, \lambda 0)$ and $p1 = (x1_{i+1}, x1_{i-1}, \lambda 1)$ if $p0 \leq p1$ then $update_i(p0) \leq update_i(p1)$. The monotonicity property still holds if we change the update function to $$update'_i(x_{i+1}, x_{i-1}, \lambda) = \min\left(U_i, \max\left(L_i, \sqrt{\frac{C_i + g_{i+1} * x_{i+1}}{(tg_i/\lambda) + g_i/x_{i-1}}}\right)\right)$$

for each $0<i\leq N$. The modified update function makes sure that the value after each update stays within the interval $[L_i, U_i]$.

The consequence of the monotonicity property for the modified update function is that for each value of $\lambda$ and start vector $x_i^{(0)}=L_i$, for each $0<i\leq N$, the approximation algorithm produces a monotonically increasing sequence $x^{(0)} \leq x^{(1)} \leq x^{(2)} \leq \ldots$. This sequence converges to $x_{\lambda,i}$, unless for some i, $x_i^{(k)}$ remains stuck at its lower bound $L_i$ or its upper bound $U_i$.

Similarly, we can start the approximation algorithm at the upper bounds, in which case the algorithm produces a monotonically decreasing sequence of drive strengths. In either case, each drive strength $x_i$ remains within its interval $[L_i, U_i]$. This handles the constraints for the upper and lower bounds.

We can exploit the monotonicity property even further. If we want to construct the trade-off curve between area and delay, for example, we must compute the values $x_\lambda$ for a sequence of values $\lambda 0, \lambda 1, \lambda 2, \ldots$ If this sequence of $\lambda$'s is a monotonic sequence, then you can use the vector $x_{\lambda 0}$ as the start vector for approximating $x_{\lambda 1}$, and $x_{\lambda 1}$ as the start vector for approximating $x_{\lambda 2}$, and so on. Depending on whether the sequence of $\lambda$s is an increasing or decreasing sequence, we must choose the lower bounds $L_i$ or the upper bounds $U_i$, respectively, as the initial start vector. This choice of start vectors of each $\lambda$ speeds up the computation of the trade-off curve even further.

For purposes of the examples in this description, we consider all drive strengths to be continuous. To deal with discrete values for the drive strengths, we can round the drive strengths in $x_\lambda$ to discrete values. Because of the rounding, we may choose suboptimal drive strengths. How much we loose in optimality depends on the resolution of the discrete drive strengths in the neighborhood of the optimal values and the gradients of the delay, area, and energy functions in the same neighborhood.

Alternatively we can compute lower and upper bounds for the discrete drive strengths that achieve the optimum. We compute the lower bounds for the optimum by always rounding downwards the update value for each $x_i$ to nearest discrete drive strength in an monotonically increasing sequence. We compute the upper bounds for the optimum by always rounding upwards the update value for each $x_i$ in a monotonically decreasing sequence. Often the gap between lower and upper bound for each drive strength is zero or very small.

AN EXAMPLE

FIG. 4 illustrates a string of three inverters with one side load and one final load in accordance with an embodiment of the present invention. Both loads associated with the circuit are 10 and drive strength $x_0=1$. The functions $D(x)$ and $A(x)$ are as follows:

$$D(x)=(1+x_1/1)+(1+10/x_1+x_2/x_1)+(1+10/x_2)A(x)=1+x_1+x_2.$$

Let us compute the area versus delay function for this example. For each $\lambda$ we have to find $x_\lambda$ satisfying $\nabla A(x)=-\lambda \nabla D(x)$ where $\nabla A(x)=[1, 1]$. Because all gates are inverters, we have $g_i=1$ and $tg_i=1$ for $i=1, 2$. The update functions for $x_1$ and $x_2$ are:

$$x_1 = \sqrt{\frac{10+x_2}{(1/\lambda)+1}} \qquad x_2 = \sqrt{\frac{10}{(1/\lambda)+1/x_1}}.$$

Let us first calculate the minimum path delay. For this purpose we choose $\lambda=\infty$. The update functions now simplify to:

$$x_1=\sqrt{10+x_2}$$

$$x_2=\sqrt{10*x_1}$$

Figure 5:
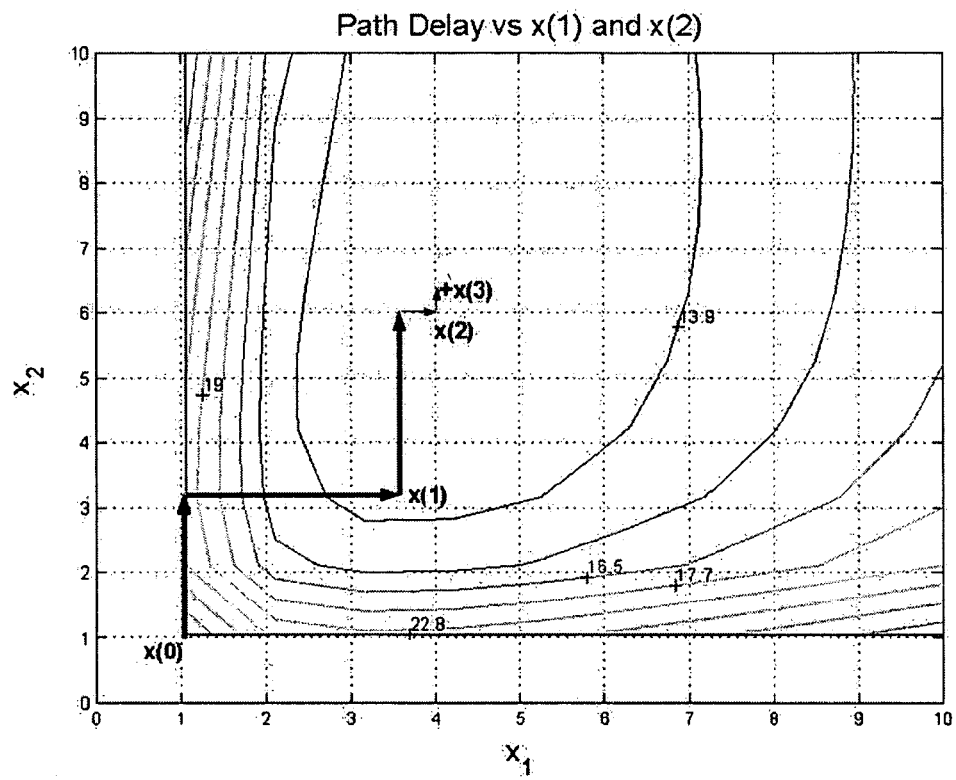
FIG. 5 illustrates the coordinate-wise descent algorithm with $\lambda = \infty$ along with a contour plot of the path delay as a function of the drive strengths $x_1$ and $x_2$ in accordance with an embodiment of the present invention.

Table 1 provides the successive values for $(x_1, x_2)$ during the execution of the coordinate-wise descent algorithm. After only six steps, or three vector values, the algorithm yields values for $(x_1, x_2)$ that are less than 1% from the actual minimum. The path delay is minimal for $(x_1, x_2)=(4.05, 6.36)$ with a path delay of approximately $12.66\tau$. The area at the minimum is approximately $(1+4.05+6.36)\alpha=11.4\alpha$. The energy dissipation by the path at the minimum is approximately $(1+2*4.05+10+2*6.36+10)\epsilon=41.8\epsilon$. FIG. 5 illustrates the coordinate-wise descent algorithm with $\lambda=\infty$ along with a contour plot of the path delay as a function of the drive strengths $x_1$ and $x_2$ in accordance with an embodiment of the present invention.

TABLE 1

| Current Value | Next Value | $x^{(0)}$ | $x^{(1)}$ | | $x^{(2)}$ | | $x^{(3)}$ |
|---|---|---|---|---|---|---|---|
| $x_1$ | $\sqrt{1*(10+x_2)}$ | 1 | 1 | 3.63 | 3.63 | 4 | 4 | 4.04 |
| $x_2$ | $\sqrt{x_1+10}$ | 1 | 3.16 | 3.16 | 6.02 | 6.02 | 6.32 | 6.35 |

Let us see how fast the algorithm converges to the final values of $x_1$ and $x_2$ when we choose $\lambda=1$. Table 2 gives the simplified update functions and the successive values for $(x_1, x_2)$ during the execution of the coordinate-wise descent algorithm. The result after each step, viz., each update, appears in the next column. After only four steps, or two vector values, the algorithm yields values for $(x_1, x_2)$ that are less than 1% from the actual solution. For $\lambda=1$, $x_\lambda=(2.52, 2.68)$ and $D(x_\lambda)\approx 14.3\tau$, $A(x_\lambda)\approx 6.2\alpha$, and $E(x_\lambda)\approx 31.4\epsilon$. We can calculate that by paying about 13% in extra path delay, the area of the path goes down by more than 45%. The energy goes down by almost 25%.

TABLE 2

| Current Value | Next Value | $x^{(0)}$ | $x^{(1)}$ | | $x^{(2)}$ | | $x^{(3)}$ |
|---|---|---|---|---|---|---|---|
| $x_1$ | $\sqrt{1*(10+x_2)/2}$ | 1 | 1 | 2.47 | 2.47 | 2.52 | 2.52 | 2.52 |
| $x_2$ | $\sqrt{10/(1+1/x_1)}$ | 1 | 2.24 | 2.24 | 2.67 | 2.67 | 2.68 | 2.68 |

Figure 6:
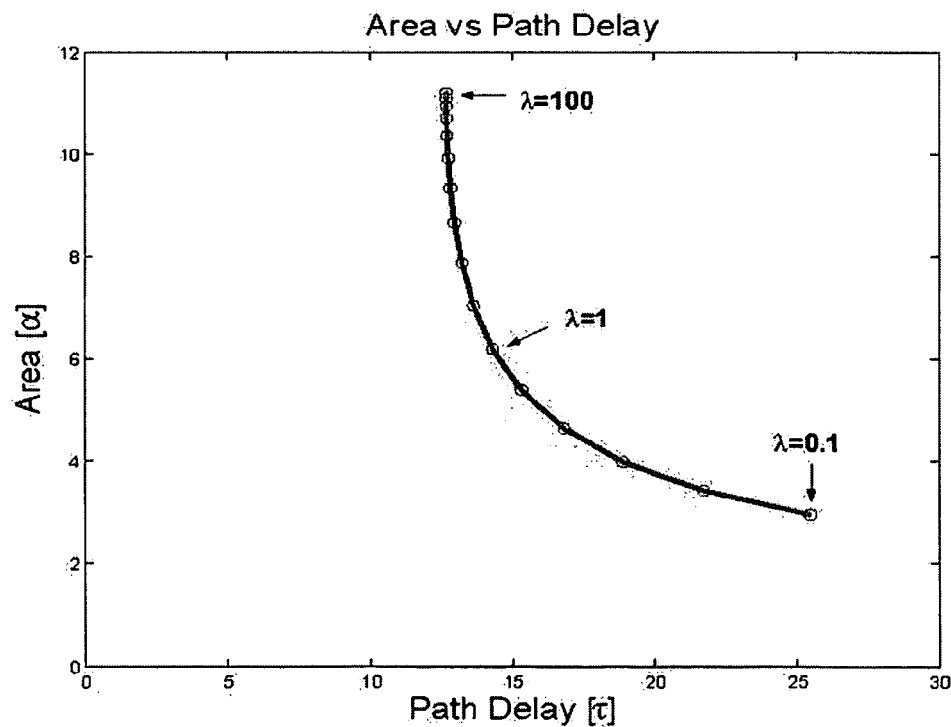
FIG. 6 presents the area versus delay function for the example circuit shown in FIG. 4 in accordance with an embodiment of the present invention.

FIG. 6 presents an area versus delay function for the example circuit shown in FIG. 4 in accordance with an embodiment of the present invention. As seen in FIG. 6, the sequence of values for $\lambda$ is $\lambda_i=a^i*0.1$ for $i=0, 1, \ldots, 15$ where $a^5=10$.

A Second Example

Figure 7:
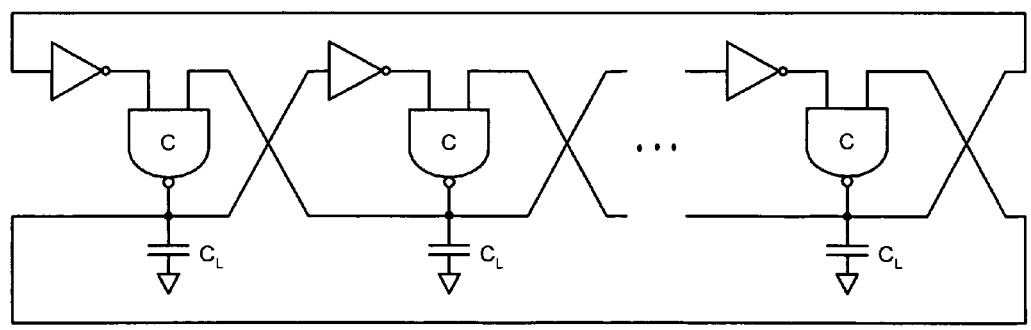
FIG. 7 illustrates a chain of C-elements connected in a ring in accordance with an embodiment of the present invention.
Figure 8:
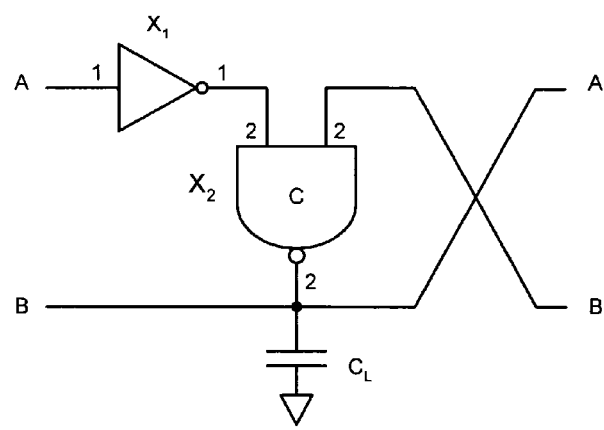
FIG. 8 illustrates a segment from a chain of C-elements in accordance with an embodiment of the present invention.

In this example we consider a network with cycles. We find the area versus delay function and the energy versus delay function for one segment of this chain of C-elements. FIG. 7 illustrates a chain of C-elements connected in a ring and FIG. 8 illustrates a segment from a chain of C-elements in accordance with an embodiment of the present invention.

When performing a constrained optimization on the circuit of FIG. 7, if we need to consider every gate in this chain of C-elements, the task is unmanageable. For our analysis purposes, however, we only consider the segment of FIG. 8, where terminals labeled A connect to each other and terminals labeled B connect to each other. Note that we labeled each input and output of a gate with the logical effort or parasitic delay of that terminal.

The delay function D(x) for this circuit is the cycle time of the cycle containing an inverter and two C-elements. The delay function is $$D(x)=(1+2*x_2/x_1)+2*(2+(C_L+x_1+2*x_2)/x_2).$$

Note that the delay of a single C-element is $4+(C_L+x_1)/x_2$.

Rather than computing the area and energy function of a complete cycle, we calculate the area and energy function of a single segment only. The area function for one segment consisting of a single C-element and an inverter is $A(x)=x_1+(2+2)*x_2$. The energy spent in a single segment consisting of one inverter and one C-element is $$E_{segment}(x)=s_1*x_1+s_2*x_2$$

$$=(1*x_1+2*x_2)+(2*x_2+C_L+2*x_2+1*x_1)$$

$$=2*x_1+6*x_2+C_L.$$

The gradients for these functions are $$\nabla D = \begin{bmatrix} 2/x_2 - 2*x_2/x_1^2 \\ 2/x_1 - 2*(C_L+x_1)/x_2^2 \end{bmatrix}, \nabla A = \begin{bmatrix} 1 \\ 4 \end{bmatrix}, \nabla E = \begin{bmatrix} 2 \\ 6 \end{bmatrix}.$$

In addition, the update functions obtained from $\nabla E = -\lambda \nabla D$ are $$x_1 = \sqrt{\frac{2*x_2}{2/\lambda + 2/x_2}} \qquad x_2 = \sqrt{\frac{2*(10+x_1)}{6/\lambda + 2/x_2}}.$$

If we want to know the minimum cycle time of this circuit, $\nabla D=0$ must hold. This condition implies that $x_1^2=x_2^2$ and $x_2^2=x_1*(C_L+x_1)$. For fixed $C_L>0$, this condition can only be satisfied for $x_1, x_2 \to \infty$ and $x_1/x_2 \to 1$. The minimum cycle time in that case is $1+2+2*(2+1+2)\tau=13\tau$. This minimum cycle time is independent of the value of $C_L$.

We can compare this minimum cycle time in the unconstrained case to the minimum cycle time in the case where all gates have equal delay. The minimum cycle time in the equal gate delay model is calculated as $3*4.56\tau=13.68\tau$. (see Ebergen 2004.) We observe that the two minimum cycle times are not far apart.

The minimum cycle time of $13\tau$ is unattainable: the energy dissipation becomes prohibitive as the cycle time approaches the minimum cycle time. Suppose we want to minimize the cycle time of the chain of C-elements and the energy dissipation of each segment. We choose to give equal weight to cycle time and energy dissipation. That is, we want to find the drive strengths x such that the gradients in the energy function and cycle time are the same, but of opposite sign. In other words, any small change in drive strengths $x_1$ and $x_2$ that causes an increase or decrease in cycle time is counterbalanced by the same decrease or increase, respectively, in energy. For our example we take $C_L=10$.

Because we give equal weight to cycle time and energy, we choose $\lambda=1$. We must solve $\nabla D=-\nabla E$. Solving this equation by coordinate-wise descent, we find the values in Table 3. We find that for $(x_1, x_2)=(1.06, 1.76)$, the value for energy E is $24.3\epsilon$ and the value for cycle time D is $24.88\tau$. The gate delay for the inverter is $4.32\tau$ and the delay for the C-element is $10.28\tau$.

TABLE 3

| Current Value | Next Value | x$^{(0)}$ | | x$^{(1)}$ | x$^{(2)}$ | | x$^{(3)}$ |
|---|---|---|---|---|---|---|---|
| $x_1$ | $\sqrt{(2*x_2)/(2+2/x_2)}$ | 1 | 1 | 1.01 | 1.01 | 1.06 | 1.06 | 1.06 |
| $x_2$ | $\sqrt{2*(10+x_1)/(6+2/x_2)}$ | 1 | 1.65 | 1.65 | 1.75 | 1.76 | 1.76 | 1.76 |

Figure 9:
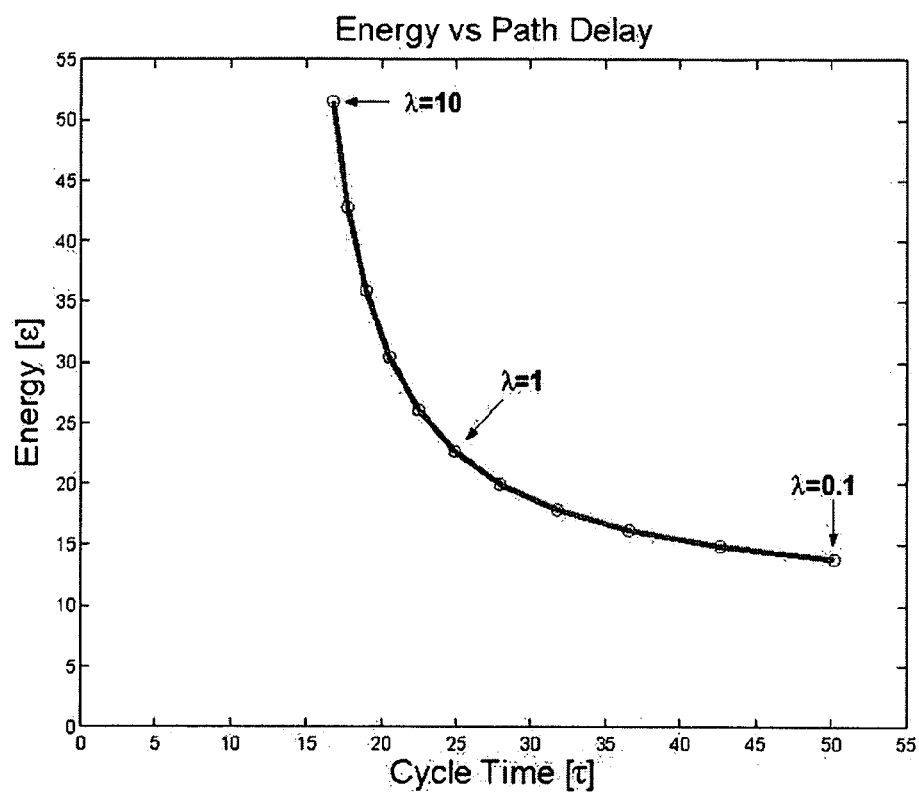
FIG. 9 illustrates the energy versus delay function for the example circuit in FIG. 8 in accordance with an embodiment of the present invention.

FIG. 9 illustrates the energy versus delay function for the example circuit in FIG. 8 in accordance with an embodiment of the present invention. As seen in FIG. 9, the sequence of values for $\lambda$ is $\lambda_i = a^i * 0.1$ for $i=0, 1, \ldots, 10$ where $a^5=10$.

Including Resistive Wires

Figure 10:
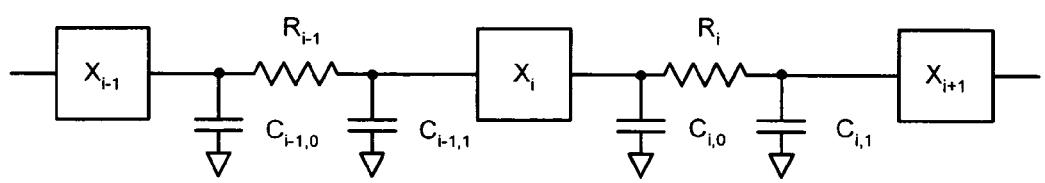
FIG. 10 illustrates a path with side loads and resistive wires in accordance with an embodiment of the present invention.

We can generalize our model by including resistive wires between gates. FIG. 10 illustrates a path with side loads and resistive wires in accordance with an embodiment of the present invention. Note that we represent wires between gates by means of pi models, and we have merged any side loads to the wire load before and after the resistor. The variables $x_{i-1}$, $x_i$, $x_{i+1}$ represent drive strengths, $C_{i-1,0}$, $C_{i-1,1}$, $C_{i,0}$, $C_{i,1}$ represent fixed capacitances, and $R_{i-1}$, $R_i$ represent fixed resistances. We define $C_i$ as the total side load of stage i, i.e., $C_i=C_{i,0}+C_{i,1}$. When the wire load $C_w$ is the only side load, then $C_{i,0}=C_{i,1}=C_{w/2}$.

Recall that the units for drive strength and capacitance are $\kappa/\tau$ and $\kappa$ respectively. Because resistance is the reciprocal of drive strength, also known as conductance, the units for resistance are $\tau/\kappa$.

Because of the addition of resistive wires, we must add to the path delay D(x) the delays due to the resistance of the wire. We use the Elmore delay model to update the stage delay of each stage. For stage i we obtain for the stage delay $$s_i = p_i + (g_{i+1}*x_{i+1}+C_i)/x_i + R_i*C_{i,1} + R_i*g_{i+1}*x_{i+1},$$

where the terms $R_i*C_{i,1}+R_i*g_{i+1}*x_{i+1}$ are the delays attributable to the resistance of the wire. The total path delay becomes $$D(x) = \sum_{i=0}^{N} (p_i + R_i * C_{i,1}) + \sum_{i=0}^{N} (c_i + g_{i+1} * x_{i+1})/x_i + \sum_{i=0}^{N} R_i * g_{i+1} * x_{i+1}$$

where $g_{N+1}=0$ and $x_{N+1}=0$.

For the area function we consider the contributions of the fixed wires to be fixed. So the wires contribute only a fixed constant to A(x). The modified delay function and area functions are still convex functions in x, and thus our optimization approach still applies.

For the gradient $\nabla D$ we obtain for $0 < i \leq N$ $$(\nabla D)_i = \frac{\partial D}{\partial x_i} = (g_i/x_{i-1} - (C_i + g_{i+1}*x_{i+1})/x_i^2) + R_{i-1}*g_i$$

Because the modified area function has changed only by a fixed constant, the gradient $\nabla A$ remains the same.

We need to solve $\nabla A = -\lambda \nabla D$, where the delay function is modified. For $0 < i \leq N$, this equation reduces to $$tg_i = -\lambda*((g_i/x_{i-1} - (C_i + g_{i+1}*x_{i+1})/x_i^2) + R_{i-1}*g_i)$$

where $g_{N+1} = 0$ and $x_{N+1} = 0$. Solving for $x_i$ yields $$x_i = \sqrt{\frac{C_i + g_{i+1}*x_{i+1}}{(tg_i/\lambda) + g_i/x_{i-1} + R_{i-1}*g_i}}.$$

This equation gives the update to coordinate $x_i$ in each iteration. Note that this update function is very similar to the one without resistive wires: the only extra term is $R_{i-1}*g_i$.

The Process of Constrained Optimization

Figure 11:
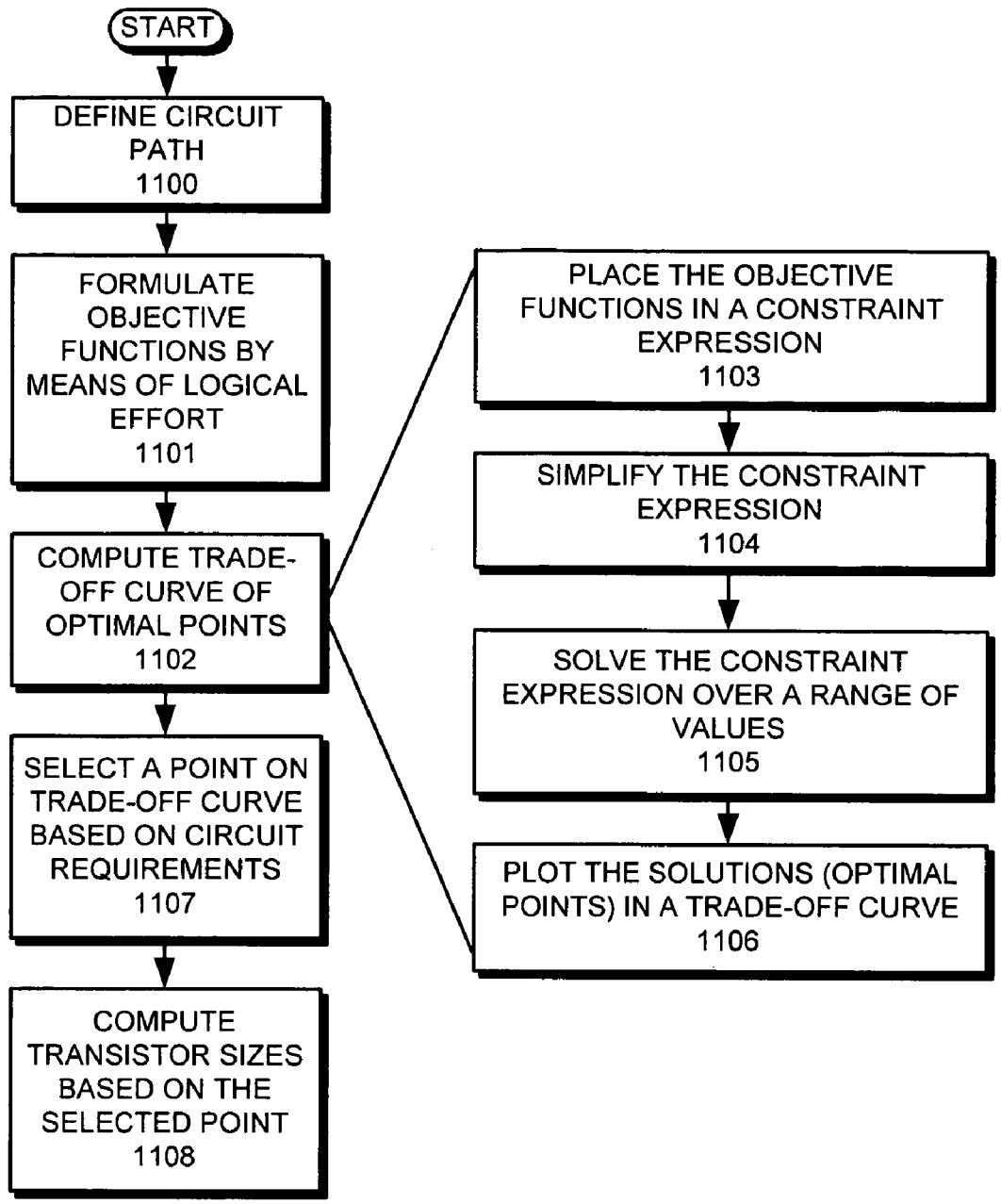
FIG. 11 presents a flow chart that illustrates the process of optimizing a first circuit parameter with a limitation based on a constraint associated with a second circuit parameter in accordance with an embodiment of the present invention.

FIG. 11 presents a flow chart that illustrates the process of optimizing a first circuit parameter with a limitation based on a constraint associated with a second circuit parameter in accordance with an embodiment of the present invention.

The process starts with the definition of a circuit path (step 1100). Defining the circuit path means selecting a circuit path that requires optimization along with a circuit path parameter for optimization and a circuit path parameter to serve as a constraint on the optimization.

For purposes of illustration, we optimize the area of the circuit path while using the path delay as the constraining parameter. The goal is to minimize the total area of the path without causing the path to experience excessive delay.

Next, the system formulates objective functions for the chosen parameters based on the theory of logical effort (step 1101). For the purposes of illustration, assume that the objective function for path delay is D(x) and the objective function for area is A(x).

The system then computes a trade-off curve of optimal points (step 1102). In order to compute the trade-off curve, the system first expresses the objective functions in a constraint expression (step 1103).

Note that the constraint expression mathematically articulates the optimization. For this example, the constraint expression is "find x that minimizes A(x) subject to D(x) $\leq D_0$" (where $D_0$ is the limit on the total delay of the path).

Next, the system simplifies the constraint expression (step 1104). The system first converts the constraint expression to an equivalent Lagrangian relaxation expression. The system then substitutes the gradients of A(x) and D(x) into the Lagrangian relaxation expression. Following these operations, the constraint expression is: $\nabla A(x) = -\lambda \nabla D(x)$, for some $\lambda > 0$ (where $\lambda$ is a Lagrangian multiplier).

The system then solves the constraint expression for a set of $\lambda$ values (step 1105) and plots the solutions in a trade-off curve (step 1106). Note that the solution of the constraint expression for each $\lambda$ is the "optimal point" for that $\lambda$, where the area is reduced as much as possible while still maintaining the required maximum path delay of $D_0$.

Next, the circuit designer selects a point on the trade-off curve where the trade-off between area and path delay fits the requirements of the circuit (step 1107). The designer then computes the sizes for the transistors of the circuit path based on the selected point (step 1108).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a constrained optimization to determine circuit parameters, comprising:
    selecting two types of circuit parameters associated with a circuit path, wherein the optimization is to be performed on the first circuit parameter while a limitation on second circuit parameter functions as a constraint on the optimization of the first circuit parameter;
    generating objective functions which model the first circuit parameter and the second circuit parameter in terms of logical effort, wherein logical effort is used to characterize one or more gates in the circuit path by computing each gate's driving capability relative to that of a reference inverter;
    generating a constraint expression from the objective functions, wherein the constraint expression mathematically relates the optimization of the first circuit parameter to the constraint on the second circuit parameter;
    computing and plotting a trade-off curve by solving the constraint expression, wherein the constraint expression is $\nabla A(x) = -\lambda \nabla B(x)$, for all $\lambda > 0$, and where $\lambda$ is a Lagrangian multiplier, A(x) is an expression for the first parameter of the circuit path, and B(x) is an expression for the second parameter of the circuit path; and
    computing transistor sizes for the circuit path based on a selected point from the trade-off curve.

2. The method of claim 1, wherein the parameters of the circuit path include at least one of:
    area;
    path delay;
    energy consumption; or
    a circuit path parameter which can be expressed using the theory of logical effort.

3. The method of claim 2, where the path delay through the circuit path includes wire delay.

4. The method of claim 2, wherein generating the constraint expression involves:
    placing the objective functions into a constraint expression;
    performing a Lagrangian relaxation on the constraint expression; and
    modifying the constraint expression using the gradients of the objective functions.

5. The method of claim 4, wherein computing the trade-off curve involves:
    solving the constraint expression for each Lagrangian multiplier in a set of Lagrangian multipliers; and
    plotting the value of each solution of the constraint expression as a point on the trade-off curve.

6. The method of claim 5, wherein solving the constraint expression involves using the iterative process of coordinate-wise descent.

7. The method of claim 1, wherein selecting a point on the trade-off curve involves selecting the point on the curve that corresponds to the desired relationship between the first circuit parameter and the second circuit parameter.

8. A computer-readable storage medium storing instructions that when executed by a computer cause the computer to perform a method for performing a constrained optimization to determine circuit parameters, comprising:
    selecting two types of circuit parameters associated with a circuit path, wherein the optimization is to be performed on the first circuit parameter while a limitation on second circuit parameter functions as a constraint on the optimization of the first circuit parameter;
    generating objective functions which model the first circuit parameter and the second circuit parameter in terms of logical effort, wherein logical effort is used to characterize one or more gates in the circuit path by computing each gate's driving capability relative to that of a reference inverter;
    generating a constraint expression from the objective functions, wherein the constraint expression mathematically relates the optimization of the first circuit parameter to the constraint on the second circuit parameter;
    computing and plotting a trade-off curve by solving the constraint expression, wherein the constraint expression is $\nabla A(x) = -\lambda \nabla B(x)$ for all $\lambda > 0$, and where $\lambda$ is a Lagrangian multiplier, $A(x)$ is an expression for the first parameter of the circuit path, and $B(x)$ is an expression for the second parameter of the circuit path; and
    computing transistor sizes for the circuit path based on a selected point from the trade-off curve.

9. The computer-readable storage medium of claim 8, wherein the parameters of the circuit path include at least one of:
    area;
    path delay;
    energy consumption; or
    a circuit path parameter which can be expressed using the theory of logical effort.

10. The computer-readable storage medium of claim 9, where the path delay through the circuit path includes wire delay.

11. The computer-readable storage medium of claim 9, wherein generating the constraint expression involves:
    placing the objective functions into a constraint expression;
    performing a Lagrangian relaxation on the constraint expression; and
    modifying the constraint expression using the gradients of the objective functions.

12. The computer-readable storage medium of claim 11, wherein computing the trade-off curve involves:
    solving the constraint expression for each Lagrangian multiplier in a set of Lagrangian multipliers; and
    plotting the value of each solution of the constraint expression as a point on the trade-off curve.

13. The method of claim 12, wherein solving the constraint expression involves using the iterative process of coordinate-wise descent.

14. The method of claim 8, wherein selecting a point on the trade-off curve involves selecting the point on the curve that corresponds to the desired relationship between the first circuit parameter and the second circuit parameter.

15. An apparatus for performing a constrained optimization to determine circuit parameters, the apparatus comprising:
    a processor;
    a selection mechanism configured to select two types of circuit parameters associated with a circuit path, wherein the optimization is to be performed on the first circuit parameter while a limitation on second circuit parameter functions as a constraint on the optimization of the first circuit parameter; and
    an execution mechanism on the processor, wherein the execution mechanism configured to:
        generate objective functions which model the first circuit parameter and the second circuit parameter in terms of logical effort, wherein logical effort is used to characterize one or more gates in the circuit path by computing each gate's driving capability relative to that of a reference inverter;
        generate a constraint expression from the objective functions, wherein the constraint expression mathematically relates the optimization of the first circuit parameter to the constraint on the second circuit parameter;
        compute and plot a trade-off curve by solving the constraint expression, wherein the constraint expression is $\nabla A(x) = -\lambda \nabla B(x)$, for all $\lambda > 0$, and where $\lambda$ is a Lagrangian multiplier, $A(x)$ is an expression for the first parameter of the circuit path, and $B(x)$ is an expression for the second parameter of the circuit path; and to
    compute transistor sizes for the circuit path based on a selected point from the trade-off curve.

* * * * *